US008540125B2

(12) United States Patent
Newbill (10) Patent No.: US 8,540,125 B2
(45) Date of Patent: Sep. 24, 2013

(54) SPARE TIRE CARRIER ASSEMBLY (76) Inventor: Anthony J. Newbill, Wickenburg, AZ (US)

( * ) Notice: Subject to any disclaimer, the term of this patent is extended or adjusted under 35 U.S.C. 154(b) by 1172 days.

(21) Appl. No.: 11/863,178

(22) Filed: Sep. 27, 2007

(65) Prior Publication Data
US 2008/0011793 A1 Jan. 17, 2008

Related U.S. Application Data (63) Continuation-in-part of application No. 11/688,781, filed on Mar. 20, 2007, and a continuation-in-part of application No. 10/784,654, filed on Feb. 23, 2004, now abandoned.

(51) Int. Cl.
B62D 43/00 (2006.01)
(52) U.S. Cl.
USPC .............. 224/42.21; 224/42.28; 224/503; 224/512
(58) Field of Classification Search
USPC .......... 224/502, 505, 506, 509, 42.21, 42.24, 224/42.28, 512–519, 523, 529; 280/460.1, 280/461.1
See application file for complete search history.

(56) References Cited

U.S. PATENT DOCUMENTS

| | | | |
|---|---|---|---|
| 3,878,695 A * | 4/1975 | Pitner | 464/89 |
| 4,155,472 A * | 5/1979 | Dansbury | 414/466 |
| 4,654,757 A | 3/1987 | Birkhauser | |
| 4,679,717 A | 7/1987 | Hansen | |
| 4,937,712 A | 6/1990 | Caffin et al. | |
| 4,971,237 A * | 11/1990 | Davis | 224/506 |
| 5,104,015 A | 4/1992 | Johnson | |
| 5,150,961 A | 9/1992 | Gonzalez | |
| 5,186,371 A | 2/1993 | Jozefczak et al. | |
| 5,192,125 A | 3/1993 | Gonzalez | |
| 5,255,166 A | 10/1993 | Gonzalez | |
| 5,333,766 A | 8/1994 | Fisher | |
| 5,544,799 A | 8/1996 | Didlake | |
| 5,550,718 A | 8/1996 | Shy | |
| 5,664,717 A | 9/1997 | Joder | |
| 5,806,736 A | 9/1998 | Kincart | |
| 5,806,737 A | 9/1998 | Clark | |
| D404,612 S | 1/1999 | Blazevich | |
| 6,189,748 B1 * | 2/2001 | Hutter et al. | 224/42.21 |
| 6,386,410 B1 | 5/2002 | Van Dusen et al. | |
| 6,404,334 B1 | 6/2002 | Chao | |
| 6,419,286 B1 | 7/2002 | Szablewski | |
| D473,835 S | 4/2003 | Roehmer et al. | |
| 6,631,834 B2 | 10/2003 | Slovick | |
| 6,659,318 B2 * | 12/2003 | Newbill | 224/503 |
| 6,788,190 B2 | 9/2004 | Bishop | |
| D505,649 S | 5/2005 | Kenney | |
| D506,421 S | 6/2005 | Newbill | |
| 6,923,351 B2 * | 8/2005 | Roehmer et al. | 224/42.21 |
| 7,100,956 B1 | 9/2006 | Wilkins | |
| 2003/0024958 A1 | 2/2003 | Slovick | |
| 2004/0050886 A1 | 3/2004 | Slovick | |
| 2004/0079774 A1 * | 4/2004 | Roehmer et al. | 224/42.21 |
| 2004/0222261 A1 * | 11/2004 | Wilson | 224/509 |
| 2005/0077327 A1 * | 4/2005 | Kenney | 224/42.21 |
| 2005/0184111 A1 | 8/2005 | Newbill et al. | |
| 2006/0171704 A1 | 8/2006 | Bingle et al. | |

* cited by examiner

Primary Examiner — Nathan J Newhouse
Assistant Examiner — Corey Skurdal
(74) Attorney, Agent, or Firm — Greg L. Martinez (57) ABSTRACT A vehicle includes a vehicle frame having D-ring latch and hinge assemblies coupled thereto. The D-ring latch and hinge assemblies include a latch and hinge sleeve, respectively. A tire carrier assembly is rotatably mounted to the D-ring hinge assembly, wherein the tire carrier assembly is repeatably moveable between raised and lowered positions.

33 Claims, 10 Drawing Sheets

SPARE TIRE CARRIER ASSEMBLY

CROSS-REFERENCE TO RELATED APPLICATIONS

This application is a continuation-in-part of U.S. patent application Ser. Nos. 10/784,654 and 11/688,781 filed on Feb. 23, 2004 and Mar. 20, 2007, respectively, the contents of both of which are incorporated herein by reference.

BACKGROUND OF THE INVENTION

1. Field of the Invention

This invention relates generally to vehicles which carry a spare tire.

2. Description of the Related Art

Most vehicles have a spare tire, which can be carried by it at many different locations. For example, some spare tires are carried on the undercarriage of the vehicle, but most of them are carried in the vehicle trunk. Sport utility vehicles, however, typically do not have a trunk so the spare tire must be carried elsewhere. Further, tires for sport utility vehicles are generally large in size and weight, which makes it inconvenient to position them on and remove them from the undercarriage and the vehicle's interior.

Hence, sport utility vehicles often include a spare tire carrier assembly, positioned at their rearward end, for holding the spare tire. Examples of these spare tire carrier assemblies can be found in U.S. Pat. Nos. 5,333,766, 5,186,371 and 5,104,015. However, their use often requires the operator to lift the spare tire, which is strenuous if the spare tire is heavy and bulky. Further, the difficulty in lifting the spare tire is increased if the vehicle is located on an uneven surface.

BRIEF SUMMARY OF THE INVENTION

The present invention involves a tire carrier assembly carried by a vehicle with a D-ring hinge assembly. The vehicle includes a vehicle frame having mounting arms, wherein the D-ring hinge assembly is attached to one of the mounting arms. A D-ring latch assembly is generally attached to another of the mounting arms. In one embodiment, the D-ring latch and hinge assemblies include a latch and hinge sleeve, respectively. The tire carrier assembly is rotatably mounted to the hinge sleeve so that it is repeatably moveable between stowed and deployed positions. The tire carrier assembly can be held in the stowed position with the latch included with the D-ring latch assembly. The tire carrier assembly is repeatably moveable between raised and lowered positions. In some embodiments, the tire carrier assembly is repeatably moveable between extended and retracted positions. The tire carrier assembly can carry one or more vehicle accessories, such as a license plate light and a brake light. The vehicle includes a wiring harness connected between the vehicle accessory and the vehicle's electrical system so that signals can flow therebetween.

These and other features, aspects, and advantages of the present invention will become better understood with reference to the following drawings and description.

BRIEF DESCRIPTION OF THE DRAWINGS

FIG. 1b is a top cut-away view of the vehicle of FIG. 1a.

DETAILED DESCRIPTION OF THE INVENTION

Figure 1A:
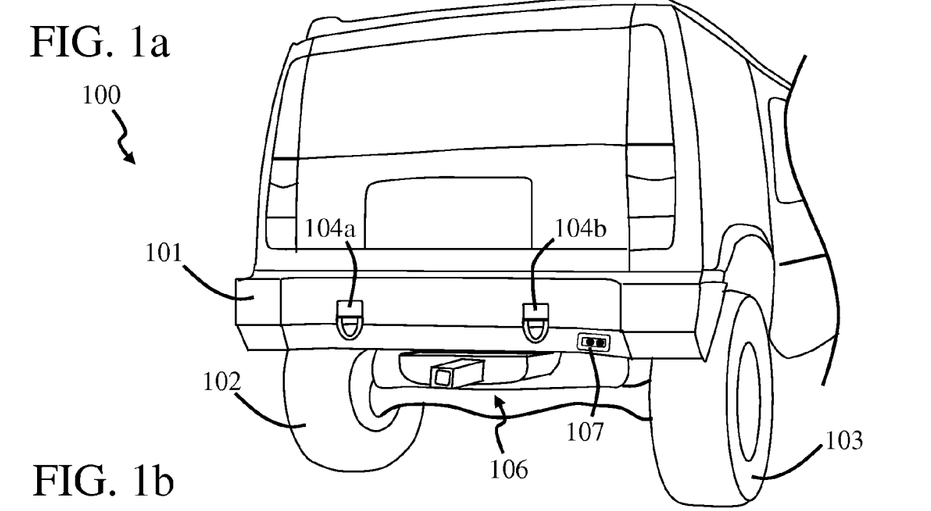
FIG. 1a is a perspective back view of a vehicle for carrying a tire carrier assembly, in accordance with the invention.
Figure 1B:
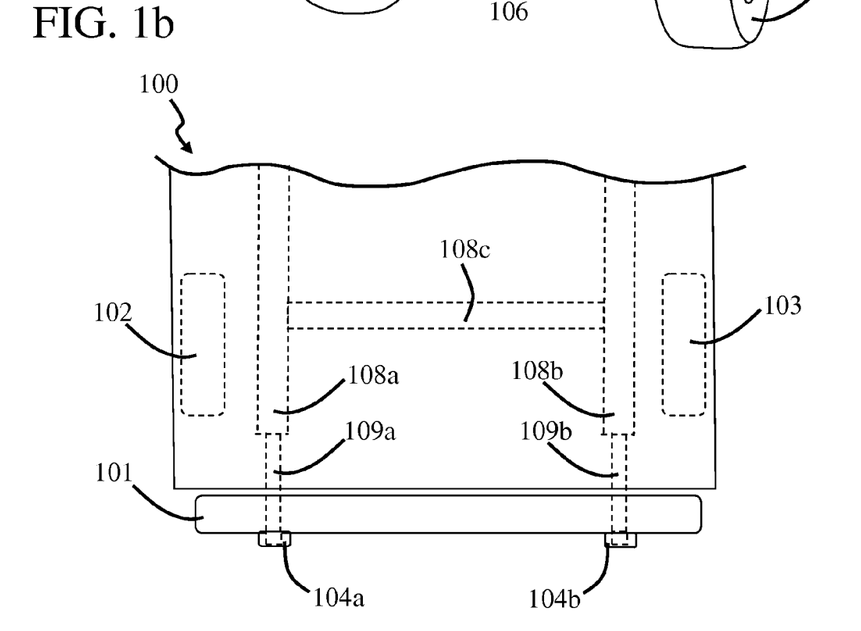

FIG. 1a is a perspective back view and FIG. 1b is a top cut-away view of a vehicle 100 for carrying a tire carrier assembly, in accordance with the invention. Vehicle 100 can be of many different types, but here it is embodied as a Hummer, which is the civilian version of the military Hum Vee vehicle. In this embodiment, vehicle 100 includes a vehicle bumper 101 and D-ring assemblies 104a and 104b positioned proximate to rear wheels 102 and 103. Vehicle 100 also includes a connector 107 and a trailer hitch mount 106 positioned proximate to rear wheels 102 and 103 and vehicle bumper 101. Connector 107 is connected to the electrical system of vehicle 100 and trailer hitch mount 106 is used to couple a trailer to vehicle 100 for towing.

In this embodiment, vehicle 100 includes a vehicle frame having longitudinal frame members 108a and 108b extending along the length of vehicle 100. The vehicle frame also includes a cross frame member 108c extending between longitudinal frame members 108a and 108b. Cross frame member 108c extends along the width of vehicle 100 near rear wheels 102 and 103. It should be noted that the vehicle frame provides support for the components included with vehicle 100, such as its engine, front and rear wheels, suspension and body. However, some of these components are not shown here for simplicity.

In this embodiment, the vehicle frame also includes mounting arms 109a and 109b which extend through vehicle bumper 101. Mounting arms 109a and 109b are coupled with longitudinal frame members 108a and 108b, respectively, at one end and to D-ring assemblies 104a and 104b, respectively, at their opposed ends. In this way, vehicle bumper 101 is held to the vehicle frame with D-ring assemblies 104a and 104b.

Figure 2:
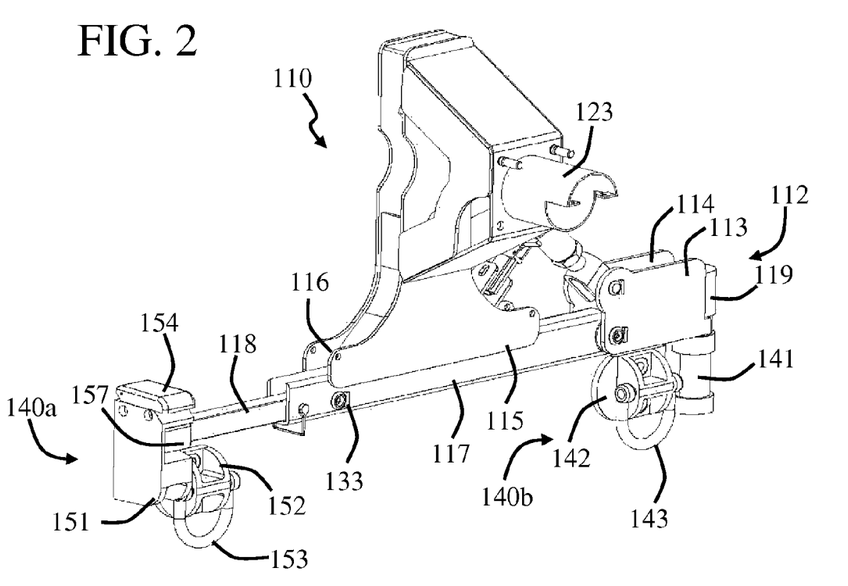
FIGS. 2 and 3 are left and right perspective views of a tire carrier assembly, in accordance with the invention, and D-ring latch and hinge assemblies.
Figure 3:
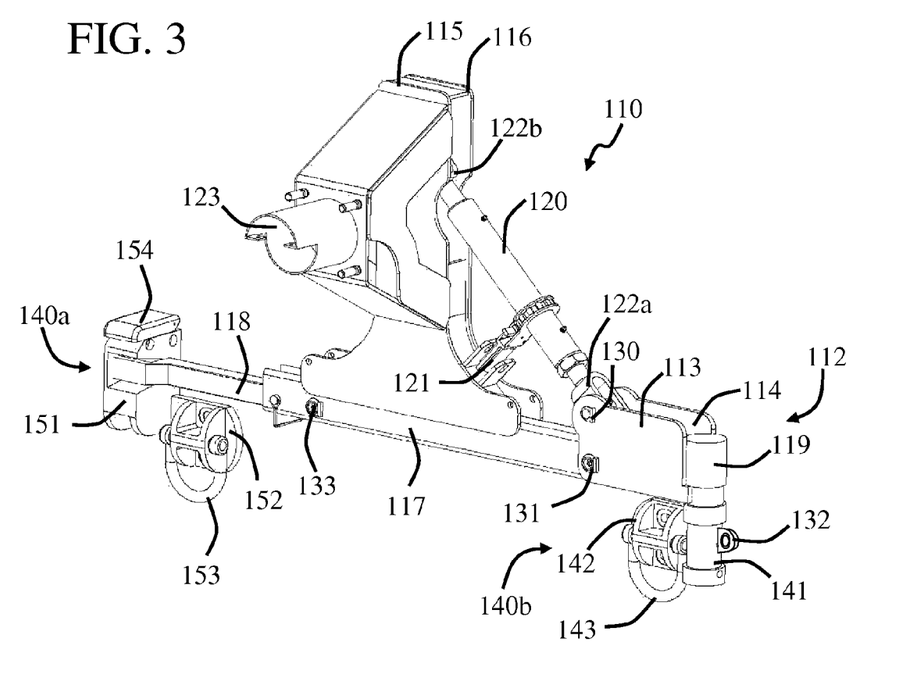
Figure 4:
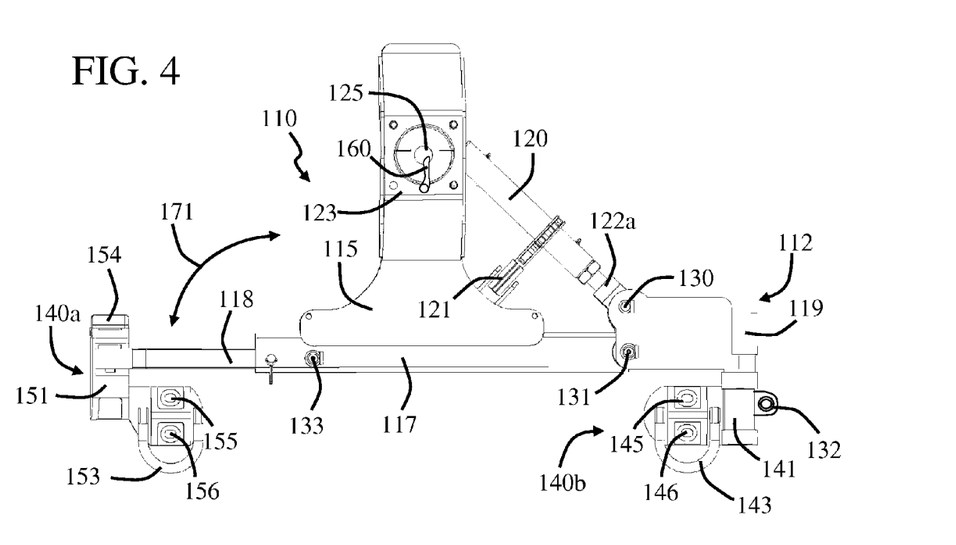
FIGS. 4 and 5 are front and back views, respectively, of the tire carrier assembly and the D-ring latch and hinge assemblies of FIGS. 2 and 3.
Figure 5:
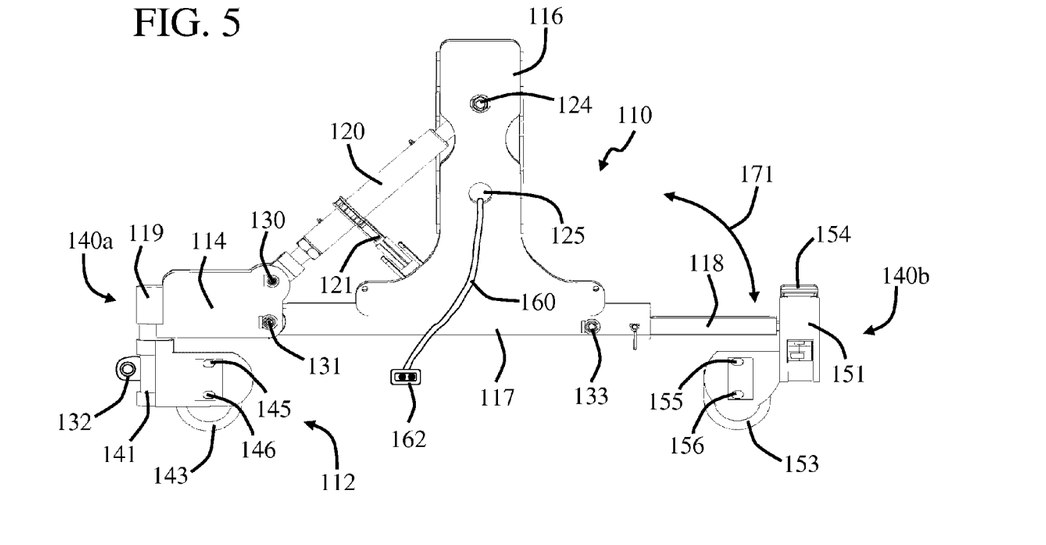
Figure 6:
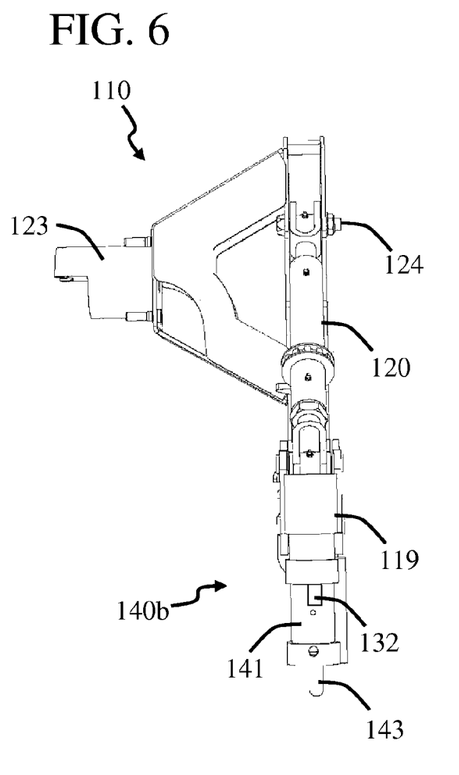
FIGS. 6 and 7 are right and left side views, respectively, of the tire carrier assembly of FIGS. 2 and 3.
Figure 7:
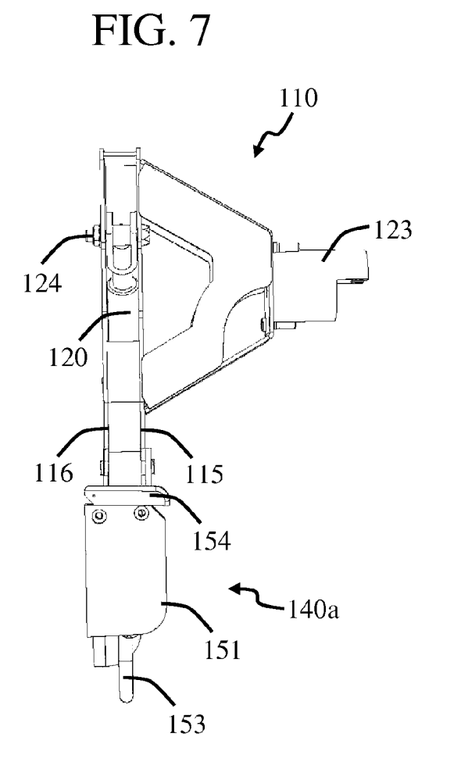
Figure 8:
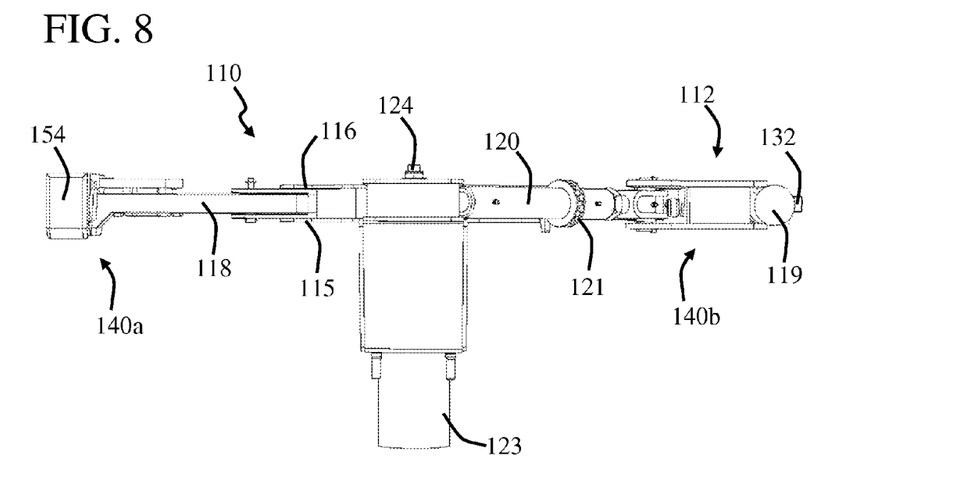
FIGS. 8 and 9 are top and bottom views, respectively, of the tire carrier assembly of FIGS. 2 and 3.
Figure 9:
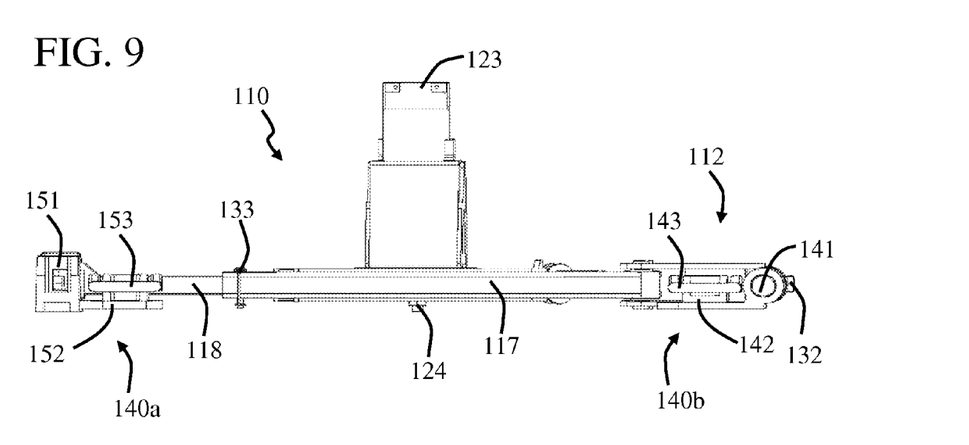

FIGS. 2 and 3 are left and right perspective views of a tire carrier assembly 110, in accordance with the invention, and D-ring latch and hinge assemblies 140a and 140b. FIGS. 4 and 5 are front and back views, respectively, of tire carrier assembly 110 and D-ring latch and hinge assemblies 140a and 140b. FIGS. 6 and 7 are right and left side views, respectively, of tire carrier assembly 110. FIGS. 8 and 9 are top and bottom views, respectively, of tire carrier assembly 110. More information regarding D-ring latch and hinge assemblies 140*a* and 140*b* can be found in U.S. patent application No. 20050077327. It should be noted that D-ring latch and hinge assemblies 140*a* and 140*b* replace D-ring assemblies 104*a* and 104*b*, respectively, of FIGS. 1*a* and 1*b*. Hence, D-ring latch and hinge assemblies 140*a* and 140*b* hold vehicle bumper 101 to the frame of vehicle 100. Further, D-ring latch and hinge assemblies 140*a* and 140*b* hold tire carrier assembly 110 to vehicle 100, as will be discussed in more detail presently.

In this embodiment, D-ring hinge assembly 140*b* includes a D-ring bracket 142 which carries a D-ring 143, wherein D-ring bracket 142 is coupled with a hinge sleeve 141. As shown in FIGS. 4 and 5, D-ring bracket 142 is held to mounting arm 109*b* with bolts 145 and 146 which extend therethrough. D-ring bracket 142 and hinge sleeve 141 can be coupled with each other in many different ways, but here they are a single integral piece. Hinge sleeve 141 includes an upwardly facing opening sized and shaped to receive a mounting post (not shown).

In accordance with the invention, D-ring hinge assembly 140*b* includes an eyelet 132 coupled with hinge sleeve 141. Eyelet 132 is sized and shaped to receive a bolt (not shown) to hold D-ring hinge assembly 140*b* to vehicle bumper 101. This reduces the amount of vibrations experienced by D-ring hinge assembly 140*b* in response to the movement of vehicle 100.

In this embodiment, D-ring latch assembly 140*a* includes a D-ring bracket 152 which carries a D-ring 153, wherein D-ring bracket 152 is coupled with a latch 151. D-ring bracket 152 and latch 151 can be coupled with each other in many different ways, but here they are a single integral piece. As shown in FIGS. 4 and 5, D-ring bracket 152 is held to mounting arm 109*a* with bolts 155 and 156 which extend therethrough. Latch 151 can be of many different types, but here it includes a latch release lever 154 operatively coupled with a latch plate 157. Latch plate 157 moves between latching and unlatching positions in response to the activation of latch release lever 154. In this way, latch 151 operates as a closure fastener.

In this embodiment, tire carrier assembly 110 is repeatably moveable between stowed and deployed positions, as well as raised and lowered positions. Further, tire carrier assembly 110 is repeatably moveable between extended and retracted positions. More information regarding tire carrier assembly 110 is provided in the above referenced U.S. patent application Ser. Nos. 10/784,654 and 11/688,781.

Tire carrier assembly 110 is rotatably mounted to D-ring hinge assembly 140*b*. Tire carrier assembly 110 can be rotatably mounted to D-ring hinge assembly 140*b* in many different ways. In this embodiment, tire carrier assembly 110 includes a tire carrier bracket assembly 112, which includes a downwardly extending mounting post 119 sized and shaped to be received by the upwardly facing opening of hinge sleeve 141. In this way, tire carrier assembly 110 is rotatably mounted to D-ring hinge assembly 140*b* so it is repeatably moveable between stowed and deployed positions.

Tire carrier assembly 110 can be repeatably moveable between raised and lowered positions in many different ways. In this embodiment, bracket assembly 112 includes opposed bracket plates 113 and 114 coupled with mounting post 119 and upper and lower connection points. In this embodiment, the upper connection point includes opposed openings which extend through bracket plates 113 and 114 and the lower connection point includes opposed openings which extend through bracket plates 113 and 114. It should be noted that, in this embodiment, the opposed openings for the lower connection point are positioned at a location below the opposed openings for the upper connection point.

In this embodiment, a swing arm 117 is coupled with bracket assembly 112 at the lower connection point with a pivot pin 131. Swing arm 117 can have many different shapes, but here it is U-shaped with upwardly extending opposed sidewalls. Pivot pin extends through the opposed sidewalls of swing arm 117 and the opposed openings of the lower connection point. Pivot pin 131 allows swing arm 117 to rotate relative to bracket assembly 112 so that swing arm 117 is repeatably moveable between the raised and lowered positions. Pivot pin 131, and the other pivot pins discussed herein, can be of many different types, such as threaded bolts and corresponding locking nuts.

In this embodiment, tire carrier assembly 110 includes an actuator 120 coupled with bracket assembly 112 at the upper connection point. Actuator 120 can be coupled with bracket assembly 112 at the upper connection point in many different ways. In this embodiment, actuator 120 includes a U-joint 122*a* with opposed openings extending therethrough. The opposed openings of U-joint 122*a* are aligned with the opposed openings of the upper connection point of bracket assembly 112 and a pivot pin 130 extends therethrough. In this way, actuator 120 is coupled with bracket assembly 112. Pivot pin 130 allows actuator 120 to rotate relative to bracket assembly 112 so that actuator 120 is repeatably moveable between the raised and lowered positions.

It should be noted that swing arm 117 moves between the raised and lowered positions in response to moving actuator 120 between the raised and lowered positions. Actuator 120 is operatively coupled with an actuator handle 121 and moved between the raised and lowered positions in response to moving actuator handle 121. In this way, actuator 120 is actuated using actuator handle 121. Actuator 120 can move swing arm 117 between the raised and lowered positions in many different ways, one of which will be discussed in more detail presently.

In this embodiment, actuator 120 is coupled with swing arm 117 so that swing arm 117 moves in response to the movement of actuator 120. Swing arm 117 can be coupled with actuator 120 in many different ways. In this embodiment, actuator 120 includes a U-joint 122*b* (FIG. 3) at an end opposed to U-joint 122*a*. Further, tire carrier assembly 110 includes opposed arm plates 115 and 116 which are coupled with swing arm 117 and extend upwardly therefrom where they are coupled with U-joint 122*b*. Arm plates 115 and 116 can be coupled with swing arm 117 in many different ways. In this embodiment, arm plates 115 and 116 are attached to corresponding opposed sidewalls of swing arm 117 by welding. Arm plates 115 and 116 can be coupled with U-joint 122*b* in many different ways. In this embodiment, U-joint 122*b* includes opposed openings and arm plates 115 and 116 include opposed openings. The opposed openings of U-joint 122*b* are aligned with the opposed openings of arm plates 115 and 116 and a pivot pin 124 is extended therethrough (FIG. 5).

Examples of actuators include hydraulic and pneumatic cylinder actuators. One particular type of actuator is manufactured by Thompson Saginaw and is known as Model No. PPA23. More information about actuators can be found in U.S. Pat. No. 6,659,318, which is incorporated herein by reference.

In another embodiment, actuator 120 includes a threaded sleeve and a threaded shaft operatively coupled together. The threaded shaft and threaded sleeve are operatively coupled together so they can be moved relative to each other in response to moving a hand grip. More information about actuators that include a threaded shaft and sleeve can be found in U.S. Pat. No. 6,659,318.

Actuator 120 is repeatably moveable between extended and retracted positions in response to moving actuator handle 121. When actuator 120 is moved to the extended position, actuator 120 and swing arm 117 rotate downwardly relative to pins 130 and 131, respectively, and swing arm 117 is lowered. In this way, tire carrier assembly 110 is moved to the lowered position. When actuator 120 is moved to the retracted position, actuator 120 and swing arm 117 rotate upwardly relative to pins 130 and 131, respectively, and swing arm 117 is raised. In this way, tire carrier assembly 110 is moved to the raised position.

In this embodiment, tire carrier assembly 110 includes a hub unit 123. Hub unit 123 can be positioned at many different locations, but here it is carried by arm plate 115. Hub unit is for carrying a spare tire, such as spare tire 151 shown in FIG. 10*a*. Hub unit 123 includes an opening 125 sized and shaped to receive a wiring harness 160. Wiring harness 160 is often connected to connector 107 (FIG. 1) so that it is connected to the electrical system of vehicle 100. Wiring harness 160 can be of many different types, but here it is an electrical cable which can flow electrical signals. The electrical signals can be of many different types, such as power and data signals. The electrical signals are used to operate a vehicle accessory carried by tire carrier assembly 110, as will be discussed in more detail with FIGS. 10*a*-10*d*.

Tire carrier assembly 110 can be repeatably moveable between extended and retracted positions in many different ways. In this embodiment, tire carrier assembly 110 includes a pivot arm 118, which is repeatably moveable between extended and retracted positions, as indicated by a movement arrow 171 in FIG. 4. In this embodiment, pivot arm 118 is coupled with swing arm 117 with a pivot pin 133 which extends through them. Pivot pin 133 allows pivot arm 118 to pivot relative to swing arm 117. In the extended position, pivot arm 118 extends parallel to swing arm 117 and, in the retracted position, pivot arm 118 extends at an angle relative to swing arm 117. In this way, tire carrier assembly 110 is repeatably moveable between extended and retracted positions.

In the extended position, pivot arm 118 extends away from swing arm 117 so it can be latched to D-ring latch assembly 140*a*. Swing arm 117 is latched with D-ring latch assembly 140*a* by latching it with latch 151. When pivot arm 118 is latched with latch 151, the distal end of pivot arm 118 is held by latch plate 157 and tire carrier assembly 110 is held in its stowed position by D-ring latch assembly 140*a*. When pivot arm 118 is unlatched with latch 151, latch plate 157 does not hold the distal end of pivot arm 118 and tire carrier assembly 110 is not held in its stowed position by D-ring latch assembly 140*a*. In this way, pivot arm 118 is repeatably moveable between latched and unlatched conditions with the D-ring latch assembly 140*a*. When tire carrier assembly 110 is not held in its stowed position by D-ring latch assembly 140*a*, tire carrier assembly 110 can be moved between its stowed and deployed positions, as well as its raised and lowered positions and extended and retracted positions.

Pivot arm 118 can be moved between its extended and retracted positions in many different ways. In one way, pivot arm 118 is moved from its extended position to its retracted position in response to moving tire carrier arm assembly 181 from the raised position to the lowered position so that pivot arm 118 engages a support structure (not shown). The support structure is generally the structure supporting vehicle 100, such as the ground, a driveway or a road. When pivot arm 118 engages the support structure, it rotates upwardly towards opposed arm plates 115 and 116. In this way, swing arm 117 does not interfere with the lowering of the spare tire carried by hub unit 123 and its removal from tire carrier assembly 110. It should be noted that pivot arm 118 can be moved from its retracted position to its extended position in many other ways, such as by grabbing it and rotating it towards opposed arm plates 115 and 116.

Figure 10A:
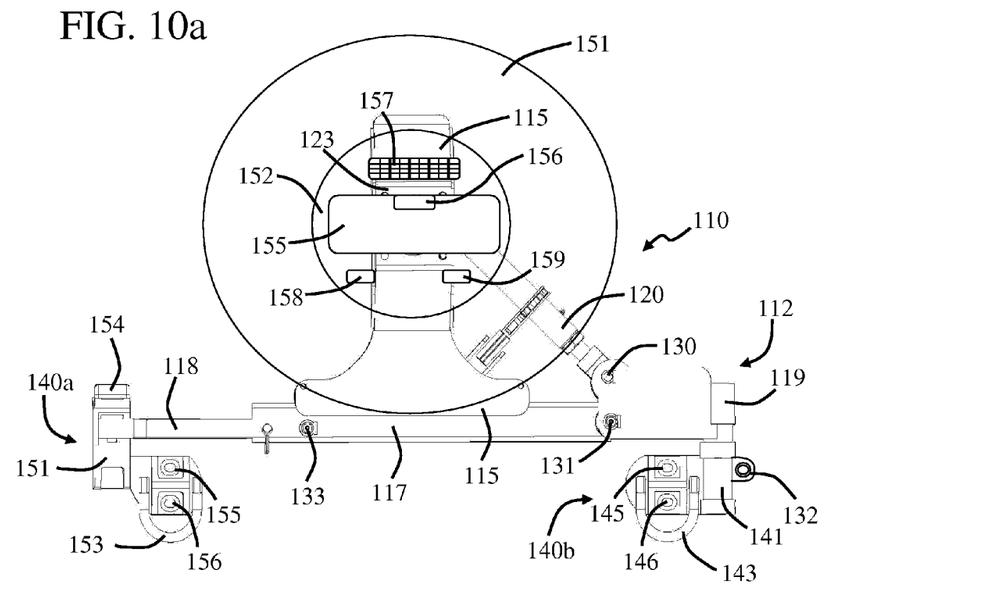
FIGS. 10a, 10b and 10c are front, back and side views, respectively, of the tire carrier assembly of FIGS. 2 and 3 carrying a vehicle accessory, in accordance with the invention.
Figure 10B:
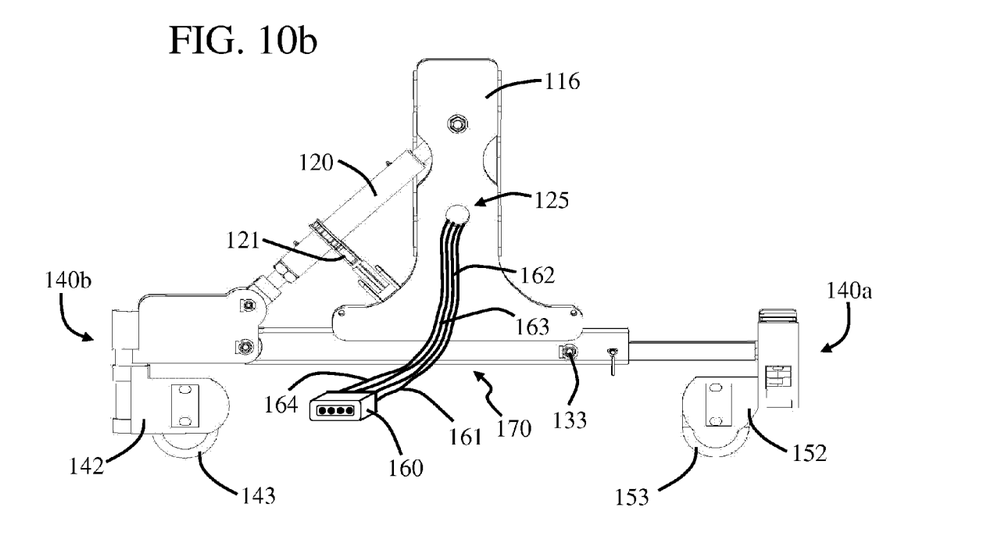
Figure 10C:
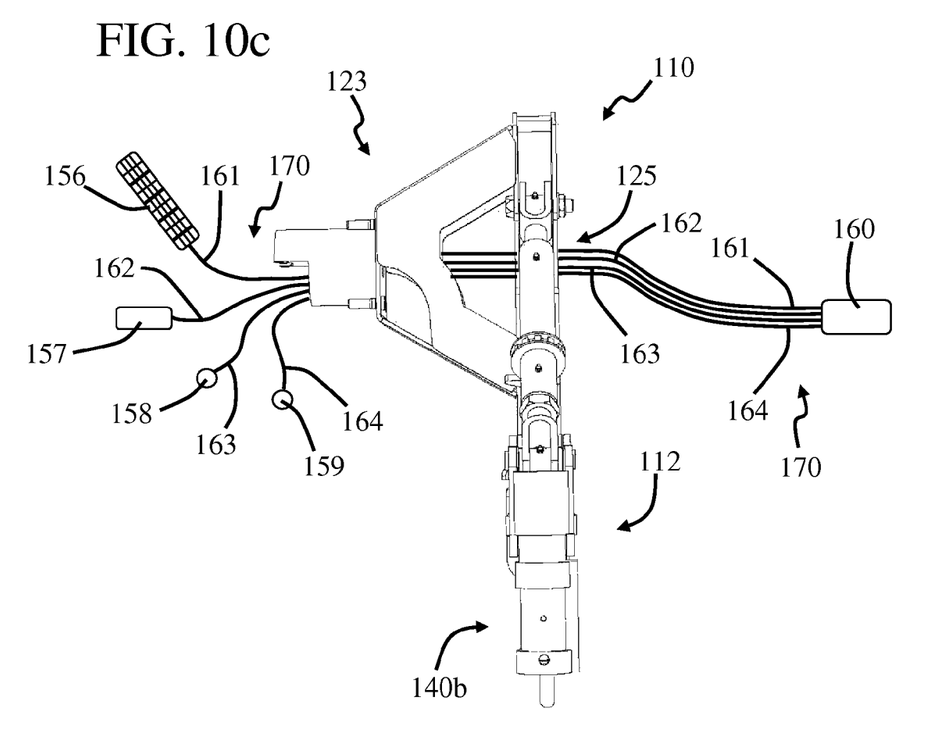

FIGS. 10*a*, 10*b* and 10*c* are front, back and side views, respectively, of tire carrier assembly 110 carrying a vehicle accessory, in accordance with the invention. In this embodiment, tire carrier assembly 110 is rotatably mounted to D-ring hinge assembly 140*b*, as discussed in more detail above, and spare tire 151, with a tire rim 152, is carried by hub unit 123. The vehicle accessory can be of many different types, several of which will be discussed in more detail presently.

In general, tire carrier assembly 110 can carry one or more vehicle accessories. However, in this embodiment, tire carrier assembly 110 carries several vehicle accessories. For example, one vehicle accessory carried by tire carrier assembly 110 is a license plate 155 and another vehicle accessory is a license plate light 156. License plate 155 is positioned so that it can be viewed when viewing the rear of vehicle 100 and license plate light 156 is positioned to illuminate license plate 155. Examples of license plate lights are disclosed in U.S. Pat. Nos. 5,150,961, 5,192,125, and 5,255,166.

It should be noted that tire carrier assembly 110 can carry many other types of vehicle accessories. For example, in this embodiment, tire carrier assembly 110 carries a brake light 157. Brake light 157 is positioned so that it can be viewed when viewing the rear of vehicle 100. Brake light 157 is often referred to as a "third brake light" and operates as a braking indicator. Brake light 157 can be of many different types, such as those disclosed in U.S. Pat. Nos. 4,654,757, 4,937,712, 5,550,718 and 6,404,334.

In this embodiment, tire carrier assembly 110 carries backup sensors 158 and 159. Backup sensors 158 and 159 can be of many different types, but here they are motion sensors which provide an indication of motion rearward of vehicle 100. This is useful so that an indication is provided to the driver of vehicle 100 that there is motion rearward of vehicle 100, which is useful for object avoidance. An example of a vehicle backup sensor is disclosed in U.S. Pat. No. 6,788,190. It should be noted that backup sensors 158 and/or 159 can be replaced with a video camera or used in conjunction with a video camera, wherein the video camera provides a visual indication to the driver of vehicle 100 for object avoidance. An example of a vehicle video camera is disclosed in U.S. Pat. No. 6,515,581 and U.S. patent application No. 20060171704.

It should also be noted that license plate light 156, brake light 157 and motions sensors 158 and 159 are generally connected to the electrical system of vehicle 100. License plate light 156, brake light 157 and motions sensors 158 and 159 can be connected the electrical system of vehicle 100 in many different ways, one of which will be discussed in more detail presently.

In this embodiment, license plate light 156 is connected to a cable 161, brake light 157 is connected to a cable 162, and motions sensors 158 and 159 are connected to cables 163 and 164, respectively, as shown in FIG. 10*c*. Cables 161, 162, 163 and 164 allow the flow of signals, such as power and data signals, between the vehicle electrical system and corresponding vehicle accessory. In this embodiment, cables 161, 162, 163 and 164 extend through opening 125 (FIG. 10*b*), which extends through arm plates 115 and 116. Cables 161, 162, 163 and 164 are connected to a connector 160. Connector 160 and cables 161, 162, 163 and 164 form a wiring harness 170. Connector 160 can be connected to connector 107 (FIG. 1) that is connected to the electrical system of vehicle 100. In this way, power and data signals can flow between the electrical system of vehicle 100 and the vehicle accessories carried by tire carrier assembly 110.

It should be noted that the vehicle accessories can be carried by tire carrier assembly 110 in many different ways. For example, one or more of the vehicle accessories can be attached to spare tire 151 and/or tire rim 152. Further, one or more of the vehicle accessories can be attached to tire carrier assembly 110, such as on arm plate 115. Another way in which vehicle accessories can be carried by tire carrier assembly 110 will be discussed in more detail presently.

Figure 10D:
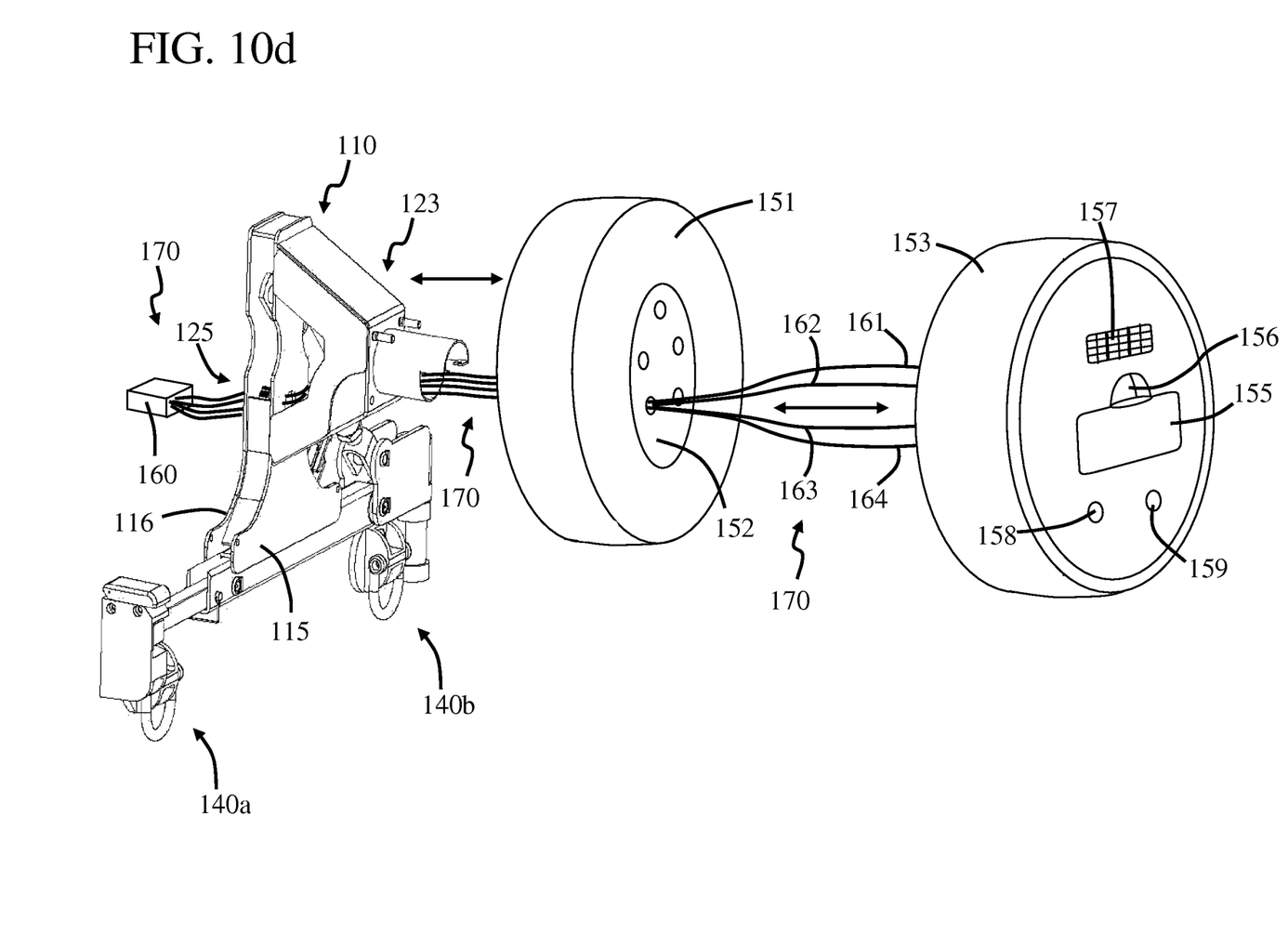
FIG. 10d is an exploded perspective view of a hub unit included with the tire carrier assembly of FIGS. 2 and 3, and a spare tire and a spare tire cover, in accordance with the invention.

FIG. 10d is an exploded perspective view of tire carrier assembly 110, spare tire 151 and a spare tire cover 153, in accordance with the invention. Spare tire cover 153 can be of many different types. Examples of spare tire covers are disclosed in U.S. Pat. Nos. D294,246, 5,076,477 and 5,921,449. In this embodiment, tire rim 152 has one or more openings extending through it. The openings can be of many different types, such as openings sized and shaped to mount spare tire 151 to hub unit 123. The openings of tire rim 152 can also be for decorative purposes.

In accordance with the invention, spare tire cover 153 carries brake light 157, license plate 155, license plate light 156 and motion sensors 158 and 159. It should be noted, however, that spare tire cover 153 can carry one or more of brake light 157, license plate 155, license plate light 156 and motion sensors 158 and 159. In this way, at least one of a license plate, license plate light, brake light and motion sensor are carried by tire carrier assembly 110. In this embodiment, spare tire cover 153 is shown carrying all of brake light 157, license plate 155, license plate light 156 and motion sensors 158 and 159 for illustrative purposes.

In accordance with the invention, cables 161, 162, 163 and 163 extend between hub unit 123 and spare tire cover 153. In this way, wiring harness 170 extends between hub unit 123 and spare tire cover 153. Cables 161, 162, 163 and 163 can extend between hub unit 123 and spare tire cover 153 in many different ways. In this embodiment, cables 161, 162, 163 and 163 extend through tire rim 152. In particular, cables 161, 162, 163 and 163 extend through opening 125 in tire rim 152.

Figure 11A:
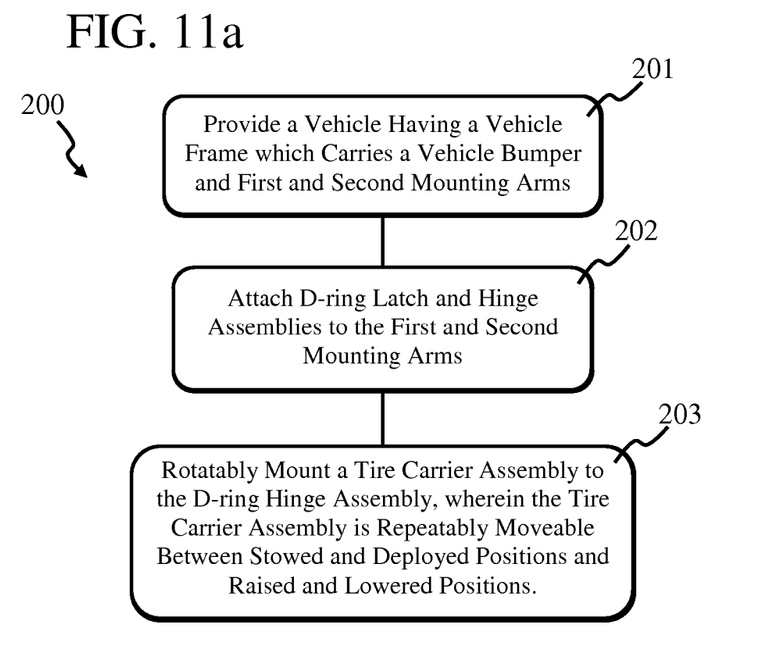
FIGS. 11a and 11b are flow diagrams of methods, in accordance with the invention, of providing a vehicle with a spare tire.

FIG. 11a is a flow diagram of a method 200, in accordance with the invention, of providing a vehicle with a spare tire. In this embodiment, method 200 includes a step 201 of providing a vehicle having a vehicle frame which carries a vehicle bumper and first and second mounting arms. The vehicle can be of many different types, such as a Hummer or Hum Vee. The vehicle bumper and vehicle frame, along with the mounting arms, are generally provided with the vehicle during its manufacture.

In this embodiment, method 200 includes a step 202 of attaching D-ring latch and hinge assemblies to the first and second mounting arms, respectively. In accordance with the invention, the D-ring latch assembly includes a latch coupled with a first D-ring bracket and the D-ring hinge assembly includes a hinge sleeve coupled with a second D-ring bracket.

It should be noted that, in some situations, step 202 includes as step of removing first and second D-ring assemblies from the first and second D-ring assembly mounting arms, respectively. The first and second D-ring assemblies are removed from corresponding first and second D-ring assembly mounting arms so they can be replaced with the D-ring latch and hinge assemblies. The first and second D-ring assemblies are generally provided with the vehicle during its manufacture and generally do not include a hinge sleeve and a latch.

In this embodiment, method 200 includes a step 203 of rotatably mounting a tire carrier assembly to the D-ring hinge assembly, wherein the tire carrier assembly is repeatably moveable between stowed and deployed positions. In accordance with the invention, the tire carrier assembly is repeatably moveable between raised and lowered positions. Further, in some embodiments, the tire carrier assembly is repeatably moveable between extended and retracted positions. In one embodiment, the tire carrier assembly includes a tire carrier bracket assembly which includes a mounting post sized and shaped to be received by the hinge sleeve of the D-ring hinge assembly. The tire carrier assembly is rotatably mounted to the D-ring hinge assembly by coupling the mounting post with the hinge sleeve.

It should be noted that method 200 can include several other steps when providing the vehicle with the spare tire. For example, in some situations, method 200 includes a step of moving the tire carrier assembly between the raised and lowered positions. Method 200 can include a step of moving the pivot arm between the extended and retracted positions. Method 200 can include a step of actuating an actuator to move the tire carrier assembly between the raised and lowered positions. Method 200 can include a step of moving the pivot arm between the extended and retracted positions in response to moving the tire carrier assembly to the lowered position. Method 200 can include a step of moving the tire carrier assembly between stowed and deployed positions. Method 200 can include a step of latching the tire carrier assembly with the D-ring latch assembly when the tire carrier assembly is in the stowed position.

Figure 11B:
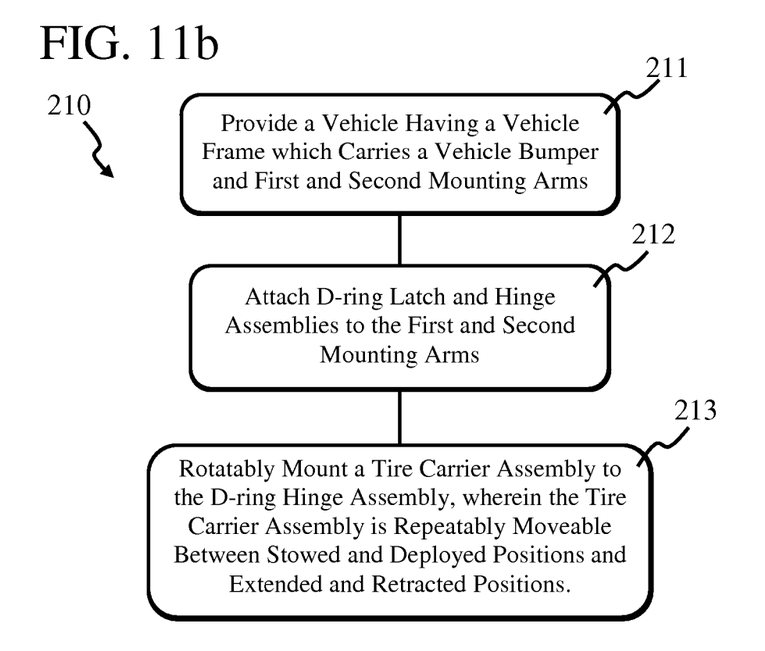

FIG. 11b is a flow diagram of a method 210, in accordance with the invention, of providing a vehicle with a spare tire. It should be noted that method 210 can include one or more of the steps of method 200. In this embodiment, method 210 includes a step 211 of providing a vehicle having a vehicle frame which carries a vehicle bumper and first and second mounting arms.

In this embodiment, method 210 includes a step 212 of attaching D-ring latch and hinge assemblies to the first and second mounting arms, respectively. In accordance with the invention, the D-ring latch assembly includes a latch coupled with a first D-ring bracket and the D-ring hinge assembly includes a hinge sleeve coupled with a second D-ring bracket.

In this embodiment, method 210 includes a step 213 of rotatably mounting a tire carrier assembly to the D-ring hinge assembly, wherein the tire carrier assembly is repeatably moveable between stowed and deployed positions. In accordance with the invention, the tire carrier assembly is repeatably moveable extended and retracted positions. Further, in some embodiments, the tire carrier assembly is repeatably moveable between raised and lowered positions.

Figure 12A:
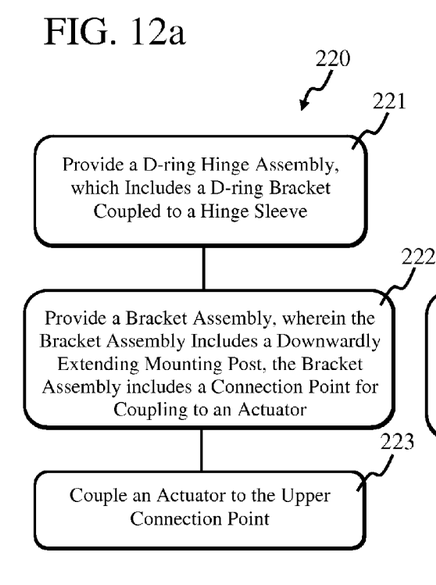
FIGS. 12a, 12b and 12c are flow diagrams of methods, in accordance with the invention, of assembling a tire carrier assembly.

FIG. 12a is a flow diagram of a method 220, in accordance with the invention, of assembling a tire carrier assembly. In this embodiment, method 220 includes a step 221 of providing a D-ring hinge assembly, which includes a D-ring bracket coupled with a hinge sleeve. The hinge sleeve includes an upwardly facing opening sized and shaped to receive a mounting post.

In this embodiment, method 220 includes a step 222 of providing a tire carrier bracket assembly, wherein the bracket assembly includes a downwardly extending mounting post. The downwardly extending mounting post is sized and shaped to be received by the upwardly facing opening of the hinge sleeve. The bracket assembly includes a connection point for coupling to an actuator. In accordance with the invention, method 220 includes a step 223 of coupling an actuator to the connection point of the bracket assembly. In some embodiments, method 220 includes a step of extending the mounting post through the hinge sleeve.

Figure 12B:
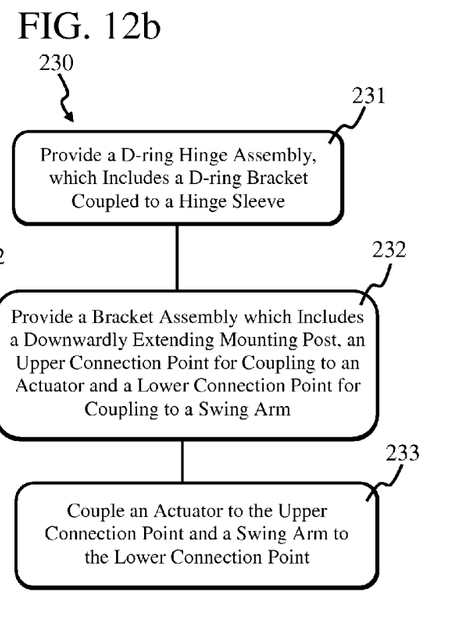

FIG. 12b is a flow diagram of a method 230, in accordance with the invention, of assembling a tire carrier assembly. In this embodiment, method 230 includes a step 231 of providing a D-ring hinge assembly, which includes a D-ring bracket coupled with a hinge sleeve. The hinge sleeve includes an upwardly facing opening sized and shaped to receive a mounting post.

In this embodiment, method 230 includes a step 232 of providing a tire carrier bracket assembly, wherein the bracket assembly includes a downwardly extending mounting post. The downwardly extending mounting post is sized and shaped to be received by the upwardly facing opening of the hinge sleeve. In some embodiments, method 230 includes a step of extending the mounting post through the hinge sleeve. The bracket assembly includes an upper connection point for coupling to an actuator and a lower connection point for coupling to a swing arm. In one embodiment, the bracket assembly includes opposed bracket plates coupled with the mounting post and the upper and lower connection points are openings extending therethrough. In accordance with the invention, method 230 includes a step 233 of coupling an actuator to the upper connection point and a swing arm to the lower connection point.

Figure 12C:
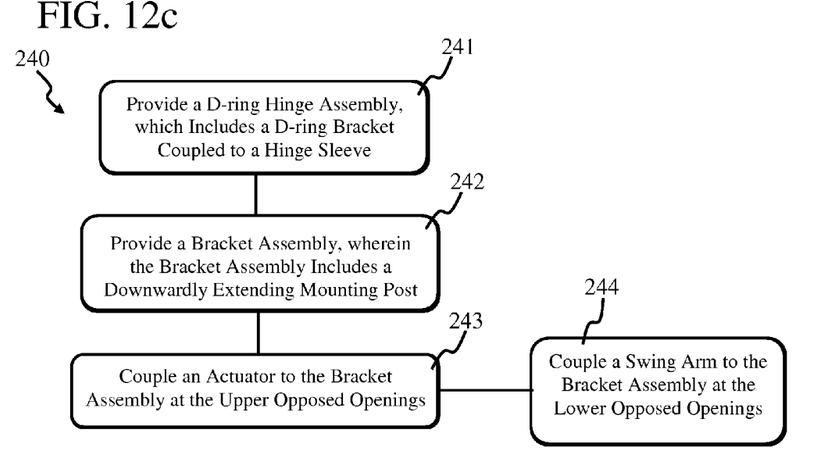

FIG. 12c is a flow diagram of a method 240, in accordance with the invention, of assembling a tire carrier assembly. In this embodiment, method 240 includes a step 241 of providing a D-ring hinge assembly, which includes a D-ring bracket coupled with a hinge sleeve. The hinge sleeve includes an upwardly facing opening sized and shaped to receive a mounting post.

In this embodiment, method 240 includes a step 242 of providing a tire carrier bracket assembly, wherein the bracket assembly includes a downwardly extending mounting post. The downwardly extending mounting post is sized and shaped to be received by the upwardly facing opening of the hinge sleeve. The bracket assembly includes opposed bracket plates coupled with the mounting post. The opposed bracket plates have upper opposed openings and lower opposed openings that operate as upper and lower connection points, respectively.

In this embodiment, method 240 includes a step 243 of coupling an actuator to the bracket assembly at the upper opposed openings. The actuator can be coupled with the bracket assembly in many different ways. In this embodiment, the actuator includes a U-joint which is coupled with the bracket assembly by extending a first coupling pin through it and the upper opposed openings.

In this embodiment, method 240 includes a step 244 of coupling a swing arm to the bracket assembly at the lower opposed openings. The swing arm can be coupled with the bracket assembly in many different ways. In this embodiment, the swing arm includes an opening extending through it which is coupled with the bracket assembly by extending a second coupling pin through it and the lower opposed openings.

The embodiments of the invention described herein are exemplary and numerous modifications, variations and rearrangements can be readily envisioned to achieve substantially equivalent results, all of which are intended to be embraced within the spirit and scope of the invention.

The invention claimed is:

1. A vehicle, comprising:
a vehicle frame having a first mounting arm;
a D-ring hinge assembly attached to the first mounting arm; and
a tire carrier assembly, which includes
a bracket assembly having a mounting post rotatably coupled to the D-ring hinge assembly;
a swing arm coupled to the braket assembly;
an actuator coupled to the bracket assembly and swing arm, the tire carrier assembly being repeatably moveable between raised and lowered positions in response to actuating the actuator, wherein the actuator is coupled to the bracket assembly and swing arm in the raised and lowered positions.

2. The vehicle of claim 1, wherein the tire carrier assembly includes a pivot arm repeatably moveable between extended and retracted positions, the pivot arm being rotatably coupled to the swing arm.

3. The vehicle of claim 2, further including a D-ring latch assembly attached to a second mounting arm of the vehicle frame, wherein the D-ring latch assembly includes a latch.

4. The vehicle of claim 3, wherein the pivot arm is repeatably moveable between latched and unlatched conditions with the D-ring latch assembly.

5. The vehicle of claim 1, further including a vehicle accessory carried by the tire carrier assembly.

6. The vehicle of claim 5, further including a wiring harness connected between the vehicle accessory and an electrical system of the vehicle.

7. The vehicle of claim 1, wherein the tire carrier assembly includes a pivot arm rotatably coupled to the swing arm, the pivot arm being repeatably moveable between latched and unlatched positions with the latch.

8. The vehicle of claim 7, wherein the pivot arm is repeatably moveable between extended and retracted positions.

9. The vehicle of claim 1, wherein the tire carrier assembly includes a U-joint coupled with the actuator.

10. The vehicle of claim 9, wherein the tire carrier bracket assembly includes opposed arm plates carried by the swing arm, the U-joint being positioned between the opposed arm plates.

11. The vehicle of claim 1, wherein the actuator is coupled to the swing arm in the raised and lowered positions.

12. The vehicle of claim 11, further including a U-joint attached to the opposed arm plates and actuator.

13. The vehicle of claim 12, wherein the swing arm carries the opposed arm plates.

14. The vehicle of claim 12, wherein the tire carrier assembly includes a pivot arm rotatably coupled with the swing arm.

15. The vehicle of claim 5, further including a wiring harness connected to the vehicle accessory and an electrical system of the vehicle so that an electrical signal can flow therebetween.

16. A vehicle, comprising:
a vehicle frame having first and second mounting arms;
D-ring latch and hinge assemblies which include a latch and hinge sleeve, respectively, the D-ring latch and hinge assemblies being attached to the first and second mounting arms, respectively; and
a tire carrier assembly, which includes
a bracket assembly rotatably coupled to the hinge sleeve;
a swing arm coupled to the bracket assembly;
opposed arm plates carried by the swing arm;
an actuator coupled to the bracket assembly and opposed arm plates, the swing arm being repeatably moveable between raised and lowered positions, wherein the actuator is coupled to the bracket assembly and swing arm in the raised and lowered positions.

17. The vehicle of claim 16, wherein the actuator moves the swing arm between the raised and lowered, positions in response to actuating the actuator.

18. The vehicle of claim 17, wherein the tire carrier assembly includes a pivot arm repeatably moveable between extended and retracted positions, the pivot arm being pivotably coupled with the swing arm.

19. The vehicle of claim 18, wherein the pivot arm is repeatably moveable between latched and unlatched positions with the D-ring latch assembly.

20. A method of providing a vehicle with a spare tire, comprising:
    providing a vehicle having a vehicle frame with a first mounting arm;
    attaching a D-ring, hinge assembly to the first mounting arm; and
    mounting a tire carrier assembly to the D-ring hinge assembly, wherein the tire carrier assembly includes
        a tire carrier bracket assembly coupled to the D-ring hinge assembly;
        a swing area coupled to the tire carrier bracket assembly;
        opposed arm plates carried by the swing arm; and
        an actuator coupled to the bracket assembly and opposed arm plates, the swing arm being repeatably moveable between raised and lowered positions, wherein the actuator is coupled to the bracket assembly and swing arm in the raised and lowered positions.

21. The method of claim 20, wherein the tire carrier assembly includes a pivot arm repeatably moveable between extended and retracted positions, the pivot arm being rotatably coupled to the swing arm.

22. The method of claim 20, wherein the step of mounting the tire carrier assembly with the D-ring hinge assembly includes rotatably mounting the tire carrier bracket assembly with a hinge sleeve included with the D-ring hinge assembly.

23. The method of claim 20, further including positioning a vehicle accessory so it is carried by the tire carrier assembly.

24. The method of claim 21, further including attaching a D-ring latch assembly to a second mounting arm of the vehicle frame, wherein the D-ring latch assembly includes a latch.

25. The method of claim 24, wherein the pivot arm is repeatably moveable between latched and unlatched conditions with the D-ring latch assembly.

26. A method of assembling a tire carrier assembly, comprising:
    providing a tire carrier bracket assembly, wherein the tire carrier bracket assembly includes a downwardly extending mounting post;
    coupling an actuator to the tire carrier bracket assembly;
    coupling a swing arm to the tire carrier bracket assembly; and
    coupling opposed arm plates to the actuator and swing arm and swing arm;
    coupling the downwardly extending mounting post to a hinge sleeve of a D-ring hinge assembly, the D-ring hinge assembly being attached to a mounting arm of a vehicle frame;
    wherein the tire carrier assembly is repeatably rotatable between raised and lowered positions in response to actuating the actuator, the actuator being coupled to the swing arm and tire carrier bracket assembly in the raised and lowered positions.

27. The method of claim 26, further including coupling the swing arm and the actuator together so that the swing arm moves between raised and lowered positions in response to actuating the actuator.

28. A vehicle, comprising:
    a vehicle frame having a first mounting arm;
    a D-ring hinge assembly attached to the first mounting arm; and
    a tire carrier assembly, which includes
        a bracket assembly having a mounting post rotatably coupled to the D-ring hinge assembly;
        a swing arm with a proximal end coupled to the bracket assembly;
        a pivot arm rotatably coupled to a distal end of the swing arm;
        an actuator with a proximal end coupled to the bracket assembly;
        an actuator handle operatively coupled to the actuator, the swing arm being repeatably moveable between raised and lowered positions in response to moving the actuator handle; and
    a D-ring latch assembly attached to a second mounting arm of the vehicle frame, wherein the D-ring latch assembly includes a latch, and wherein a distal end of the pivot arm is repeatably moveable between latched and unlatched positions with the D-ring latch assembly.

29. The vehicle of claim 28, further including opposed arm plates carried by the swing arm, wherein a distal end of the actuator is coupled to the opposed arm plates.

30. The vehicle of claim 28, further including opposed arm plates carried by the swing arm, wherein the actuator extends between the opposed arm plates.

31. The vehicle of claim 30, further including a U-joint coupled with the opposed arm plates, wherein the distal end of the actuator is coupled to the opposed arm plates through the U-joint.

32. The vehicle of claim 29, wherein the distal end of the actuator is coupled to the opposed arm plates when the swing arm is in the raised and lowered positions.

33. The vehicle of claim 29, further including a hub unit coupled to one of the arm plates of the opposed arm plates.

* * * * *